United States Patent Office.

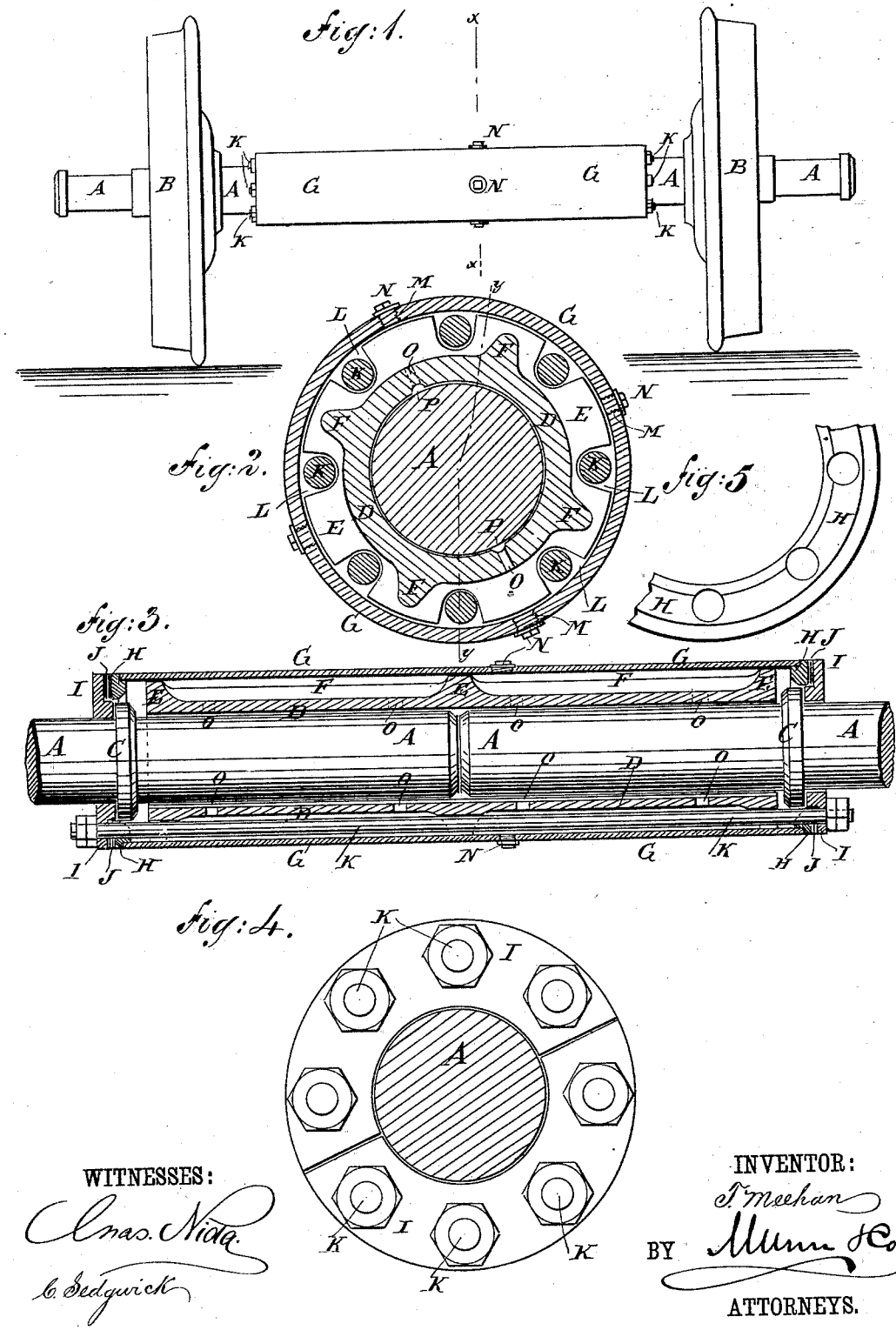

THOMAS MEEHAN, OF BROOKLYN, NEW YORK.

CAR-AXLE.

SPECIFICATION forming part of Letters Patent No. 284,462, dated September 4, 1883.

Application filed June 20, 1883. (No model.)

*To all whom it may concern:*

Be it known that I, THOMAS MEEHAN, of Brooklyn, in the county of Kings and State of New York, have invented certain new and useful Improvements in Railroad-Axles, of which the following is a full, clear, and exact description.

Reference is to be had to the accompanying drawings, forming part of this specification, in which similar letters of reference indicate corresponding parts in all the figures.

Figure 1 is a plan view of my improvement, shown with the wheels applied. Fig. 2 is a sectional end elevation of the same, taken through the line $xx$, Fig. 1. Fig. 3 is a sectional side elevation of the same, taken through the line $yy$, Fig. 2. Fig. 4 is an end elevation of the same, the axle being shown in section. Fig. 5 is an elevation of a part of one of the inner rings.

The object of this invention is to prevent the sliding of wheels upon the rails of steam and horse railroads, and the strain, wear, and loss of power consequent upon such sliding.

The invention relates to a railroad-axle made in two parts, provided with collars at a suitable distance from their ends, and having a flanged and ribbed sleeve fitted upon them between the collars. Upon the flanges of the inner sleeve is shrunk an outer sleeve, the ends of which project over the collars of the axle and rest in rabbets in rings which rest in rabbets in two-part rings placed upon the axle at the outer sides of its collars, and secured in place by bolts passing through the said rings and through recesses in the flanges of the inner sleeve. Washers are placed between the two rings, so that the wear can be readily taken up, as will be hereinafter fully described.

A represents the axle, which is made of steel or iron, and is provided with wheels B in the ordinary manner. The axle A is made in two parts, which are placed in line with and abut against each other, and have collars C formed upon them. Upon the adjacent parts of the axle A, and between the collars C, is fitted the steel casting or cast-iron sleeve D, which is formed with flanges E around its ends and center, and with four (more or less) ribs F upon its outer surface, extending from the center flange, E, to the end flanges. Upon the flanges of the inner sleeve, D, is shrunk a wrought-iron sleeve, G, the ends of which project a little beyond the ends of the said inner sleeve, D, so as to overlap the collars C, as shown in Fig. 3.

H are steel rings, which are made of the same outer diameter as the outer sleeve, G, and are rabbeted to receive the ends of the said sleeve G, so that the outer surfaces of the said rings and sleeve will be flush with each other. The inner diameter of the rings G is such that the said rings can pass over the collars C of the axle A.

Upon the axle A, at the outer sides of the collars C, are placed steel rings I, which are made in two parts, as shown in Fig. 4, so that they can be readily placed upon and removed from the said axle. The inner sides of the outer parts of the rings I are rabbeted to receive and form seats for the inner rings H.

Between the rings H I are placed a number of sheet-metal washers, J, as shown in Fig. 3, so that the wear of the parts can be taken up by removing the washers J successively.

K are long bolts which pass through holes in the rings I H and through recesses L in the flanges E, as shown in Figs. 2, 3, and 4. The bolts K can be made with a head at one end and a nut at the other; or they can have nuts at both ends, as may be desired. The latter construction is shown in Fig. 3.

In the outer sleeve, G, are formed a number of openings, M, closed by screw-plugs N, so that one or another of the said openings will always be upward when at rest, to allow oil to be readily poured into the space between the sleeves G D, which space serves as an oil-reservoir. As the axle revolves, the ribs F and bolts K serve as buckets to raise the oil and cause it to flow through the recesses L in the flanges E to the space at the ends of the inner sleeve, D, where it comes in contact with the axle A and collars C. The oil also passes through openings O in the inner sleeve, D, and along longitudinal grooves P in the inner surface of the said inner sleeve, D, so that the entire friction-surface of the axle will be kept thoroughly lubricated.

With this construction the axle can be used a long time without removing the oil. With this construction, also, either wheel B, with its connected part of axle A, can move independently of the other wheel and its part of the axle within the axle-casing, thereby avoiding the usual slip, strain, friction, and wear in rounding curves, overcoming the friction due to inequalities in the circumference of the wheels and preventing the wear of the wheel-flanges incident thereto.

Having thus described my invention, I claim as new and desire to secure by Letters Patent—

1. A railroad-axle made substantially as herein shown and described, and consisting of the axle A, made in two parts, provided with collars C, the flanged and ribbed inner sleeve, D, fitted upon the axle A, the outer sleeve, G, shrunk upon the flanges of the inner sleeve, and the rabbeted end rings, H I, and the bolts K, as set forth.

2. The combination, with an outer sleeve, G, of an inner axle-sleeve, D, having the grooves P, openings O, and on its outside, at each end and the middle, a flange, E, recessed at L and connected by ribs F, as and for the purpose specified.

3. The combination, with the collared axle A C and the outer sleeve, G, of the rings H, rabbeted to receive the sleeve ends, the two-part rings I, rabbeted to receive rings H, and the bolts K, passing through holes in said rings and having end nuts, whereby said parts are connected together, as described.

THOMAS MEEHAN.

Witnesses:
JAMES T. GRAHAM,
EDGAR TATE.

It is hereby certified that in Letters Patent No. 284,462, granted September 4, 1883, upon the application of Thomas Meehan, of Brooklyn, New York, for an improvement in "Car-Axles," an error appears requiring correction, as follows: In line 101, page 1, of the printed specification, the word "removing" should read *renewing ;* and that the patent should be read with this correction therein to make it conform to the record of the case in the Patent Office.

Signed, countersigned, and sealed this 18th day of September, A. D. 1883.

[SEAL.]
                  M. L. JOSLYN,
                   *Acting Secretary of the Interior.*

Countersigned:
  E. M. MARBLE,
    *Commissioner of Patents.*